United States Patent [19]

Himmler

[11] Patent Number: 4,817,421
[45] Date of Patent: Apr. 4, 1989

[54] METHOD AND APPARATUS FOR IMPROVEMENT OF WHEEL RUNNING CONDITIONS

[75] Inventor: Günther Himmler, Darmstadt, Fed. Rep. of Germany

[73] Assignee: Gebr. Hofmann GmbH & Co. KG, Maschinenfabrik, Pfungstadt, Fed. Rep. of Germany

[21] Appl. No.: 43,408

[22] Filed: Apr. 28, 1987

[30] Foreign Application Priority Data

Apr. 28, 1986 [DE] Fed. Rep. of Germany ....... 3614379

[51] Int. Cl.⁴ .......................................... G01M 17/02
[52] U.S. Cl. ...................................... 73/146; 364/508
[58] Field of Search .......................... 73/146, 462, 459; 364/506, 508

[56] References Cited

U.S. PATENT DOCUMENTS 4,223,386 9/1980 Maruyama et al. ................. 364/506

Primary Examiner—Donald O. Woodiel
Attorney, Agent, or Firm—Fleit, Jacobson, Cohn & Price

[57] ABSTRACT

In order to improve running characteristics of an automobile wheel comprised of rim and respective tire fitted thereon and presenting spring qualities, a matching procedure is used to readjust the tire and rim in clearly defined positions relative to each other. Radial run-out effects both of rim and tire are so arranged in opposite directions as to reduce the resulting radial run-out of the wheel. The matching consists in detail of opposing resultant tire radial force variations mathematically calculated on the basis of non-uniform mass distribution in the contact area of the tire under load with differences in tire spring rate on the one hand and radial run-out of the rim on the other hand.

7 Claims, 3 Drawing Sheets

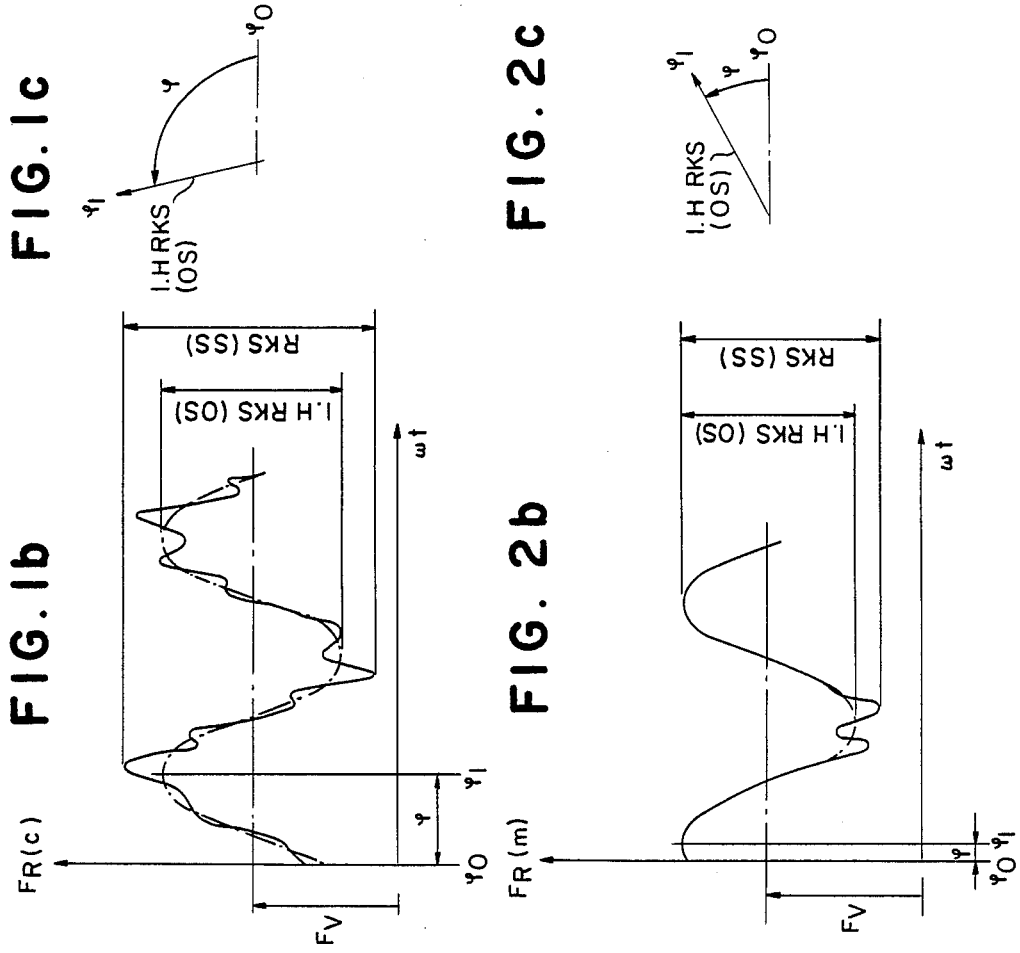

METHOD AND APPARATUS FOR IMPROVEMENT OF WHEEL RUNNING CONDITIONS

FIELD OF THE INVENTION

This invention relates to a method and apparatus for optimizing the running characteristics of vehicle wheels.

DESCRIPTION OF PRIOR ART

It is a well-known procedure (see ATZ magazine 73, 1971, no. 1 edition, pages 1 to 8) to readjust the tire and rim of an automobile wheel relative to each other by so-called "matching". It is the purpose of the matching procedure to position run-out of a tire and rim relative to each other and/or dynamic force variations, which are substantially due to differences in spring rate of the tire along its circumference, relative to run-out of the rim by readjusting the tire and rim relative to each other to clearly defined positions where run-out effects and dynamic variations respectively oppose each other so as to compensate to a great extent for radial run-out of the wheel.

With the known procedure, dynamic non-uniformities resulting from differences in spring rate and/or radial run-out of the tire, are measured on a rolling tire, with non-uniformities appearing in the form of radial force variations. In the matching procedure (readjustment of tire and rim relative to each other) maximum radial force variation of the tire is positioned diametrically opposite (180° apart) the point where maximum radial run-out of the rim occurs.

The German laid open application No. 23 33 057, relates to an apparatus for reduction of radial and/or axial run-out of automobile wheels where the rim is adjusted relative to the tire while the latter is maintained in its position. Readjustment of the rim is preferably by 180°. The scope of this publication is to position tire and rim relative to each other so that run-out of the rim and radial run-out resulting from run-out dynamic force variations of the tire compensate for each other, if not completely, at least to some extent.

With known apparatus and methods it has never been taken into account that while driving the automobile, tire load is applied from the road surface to a part of the tire circumference called the "tire contact area". While the tire is rotating and rolling on a surface, that part within the tire contact area has to be considered separately from the rest of the rotating system. If mass distribution differs along the tire circumference, there are consequently different masses in those parts of the tire which are sequentially situated within the tire contact area. This continuously changing mass in the tire contact area cannot be compensated for. Consequently, there is always a radial force variation left which is due to non-uniform mass distribution in the tire contact area.

SUMMARY OF THE INVENTION

It is an object of the present invention to provide a method and apparatus for optimizing wheel running characteristics wherein, inter alia, non-uniform mass distribution in the tire contact area is taken into account.

The invention provides a favorable way of determining the angular location of the tire radial force variation resulting from non-uniform mass distribution in the contact area of the tire under load and differences in the spring rate of the tire. Run-out, in particular radial run-out, of the rim is precisely radially opposed (that is off-set 180°) to the angular location of the resultant tire radial force variation.

The angular location of the resultant tire radial variation can be determined by vector addition. For this purpose, the tire is first set rolling at low speed for determination of radial force variations resulting from differences in spring rate of the tire along its circumference. With this first run, speed is low so that non-uniform mass distribution in the tire contact area, which increases proportionally to the square of speed, will hardly affect the measured result. Consequently, the measured result is substantially indicative of the radial force variations produced by differences in spring rate of the tiree.

Then, a second measuring run is performed with the tire rolling under load at a higher speed than previously. In this case, the speed is so selected that non-uniform mass distribution in the tire contact area will show appreciably; for example, it might be the resonance speed of the wheel suspension of a car where the wheel is to be fitted.

The two vectors obtained during the two measuring runs for radial force variations, in particular for the respective first harmonics, are added vectorially to obtain the angular location of resultant tire radial force variation including, if applicable, some influence or corrective factors for the force variations in question. During the final matching procedure, radial run-out of the rim, that is preferably with respect to its first harmonic, is directly radially opposed to (that is offset 180°) the angular location of the resultant tire radial force variation.

BRIEF DESCRIPTION OF THE DRAWINGS

The aforementioned objects and advantages of the invention will be appreciated from the following description and accompanying drawings wherein:

FIG. 1 is a schematic representation showing how radial force variations due to differences in tire spring rate are produced;

FIG. 2 is a schematic representation showing how radial force variations due to non-uniform mass distribution in the tire contact area are produced;

DETAILED DESCRIPTION OF THE PREFERRED EMBODIMENT

Figure 3B:
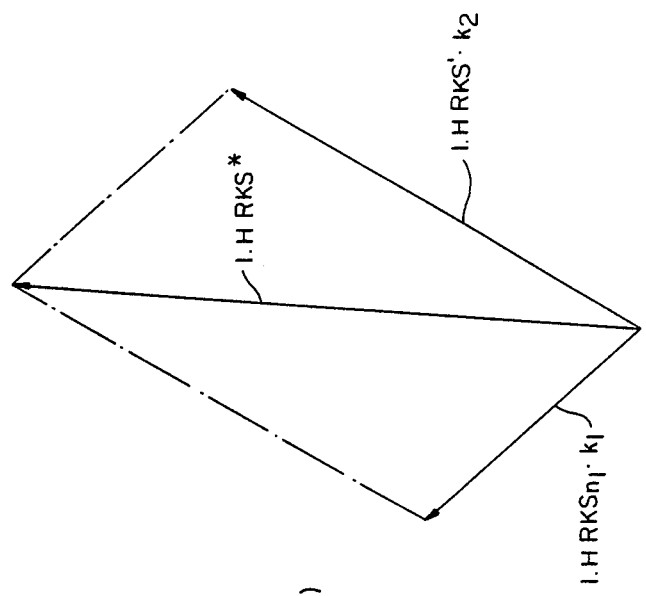
FIG. 3B is a schematic representation showing determination of the angular location of th vector of the resultant tire radial force variation comprised of the vectors of radial force variations of the rotating type.

FIG. 1 is a schemtic representation of partial spring ratese $c_1 \ldots c_n$ of tires, in particular pneumatic tires of an automobile. During the measuring run, or when fitted to the vehicle, the tire under load 7 is subjected to those differing partial spring rates distributed along its circumference and producing the radial force variations $F_R(c)$ which are plotted in FIG. 1 as a function of the angle of rotation ($\omega t$) of wheel 7. Details in FIG. 1 are:

$c_1, c_2 \ldots c_n$ = respective partial spring rates of tire 7

$F_R(c)$ = radial force variation resulting from differences in spring rate
$F_v$ = radial preload
RKS (SS) = peak-to-peak value of radial force variation
1.HRKS (OS) = first harmonic of radial force variation (zero-to-peak)
$\phi_0$ = datum angle
$\phi_1$ = phase angle of first harmonic of radial force variation 1.HRKS (OS)
$\phi$ = angular displacement between $\phi_0$ and $\phi_1$
$\omega$ = angular velocity of rotating tire 7
t = time In a first approximation it can be assumed that radial force variations due to differences in tire spring rate are independent of driving speed and only dependent on tire pressure. Hence for measurement of radial force variations resulting from differences in spring rate of tire 7 it will do in a first approximation to use the first harmonic of the peak-to-peak value as the dominant quantity.

FIG. 2 is a schematic representation of a mass distributed non-symmetrically along the circumference of tire 7. During measurement there are radial force variations $F_R(m)$ the vibration graph of which is also represented schematically in FIG. 2 wherein:

$F_R(m)$ = radial force produced by unsymmetrical mass distribution along the circumference of tire 7
$F_v$ = radial preload
RKS (SS) = peak-to-peak value of radial force variation
1.HRKS (OS) = first harmonic of radial force variation (zero-to-peak)
$\phi_0$ = datum angle
$\phi_1$ = phase angle of first harmonic of radial force variation 1.HRKS (OS)
$\phi$ = angular displacement between $\phi_0$ and $\phi_1$
$\omega$ = angular velocity of the rotating tire 7
t = time While rolling under load during measurement, or when fitted on the vehicle, the tire 7 is flattened on its tread area, that is precisely on the tire contact area 8 where it is in contact with the road surface, or test wheel surface. During rotation of the tire the part of the tire in the tire contact area has to be considered separated from the rotating system. Considering the non-uniform mass distribution along the tire tread surface the masses in the tire contact area which are considered separated from the rotating system are continuously differing, thus producing different radial forces and consequently radial force variations. It is quite obvious that improvement of mass distribution in the tire contact area is not possible, nor can it be compensated for by any means. With former matching procedures where only dynamic forces due to differing spring rates of the tire are taken into account, the radial force variations resulting from said non-uniform mass distribution in the tire contact area are not definitely compensated for, nor are they reduced to a lower level.

With the object of the present invention, it is both the radial force variations $F_R(c)$ resulting from differences in tire (7) spring rate such as illustrated in FIG. 1 and the radial force variations $F_R(m)$ resulting from non-uniform mass distribution in the contact area of the tire (7) rolling under radial preload $F_v$, which are taken into account for the following matching procedure. In the next step the angular location of the resultant tire radial force variation is determined and opposed to radial run-out of the rim in the matching process.

In general run-out of the rim results from geometric deficiencies such as eccentricity between the hub bore of the wheel and the tire seat on the rim, which shows primarily in form of radial run-out of the rim. In this case the dominant quantity of all deficiencies is the first harmonic of radial run-out resulting of both rim flanges. Relative measurement and analysis may be accomplished on a machine measuring radial and lateral run-out such as known from HOFMANN news no. 15 "Machines and equipment for the tire and rim industry", edition 9622 057 03-77, page 20.

Figure 3A:
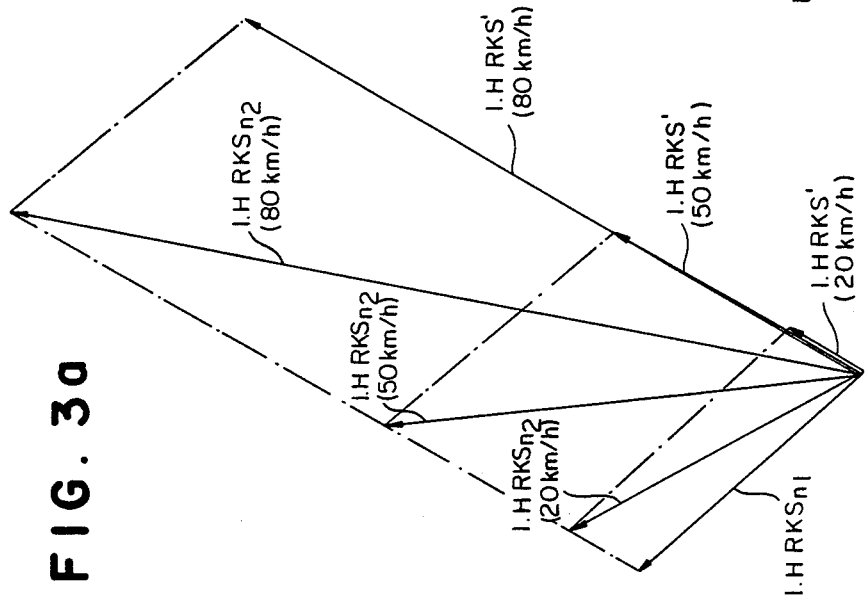
FIG. 3A illustrates vectors of radial force variations resulting from differences in tire spring rate and non-uniform mass distribution in the tire contact area.
Figure 4:
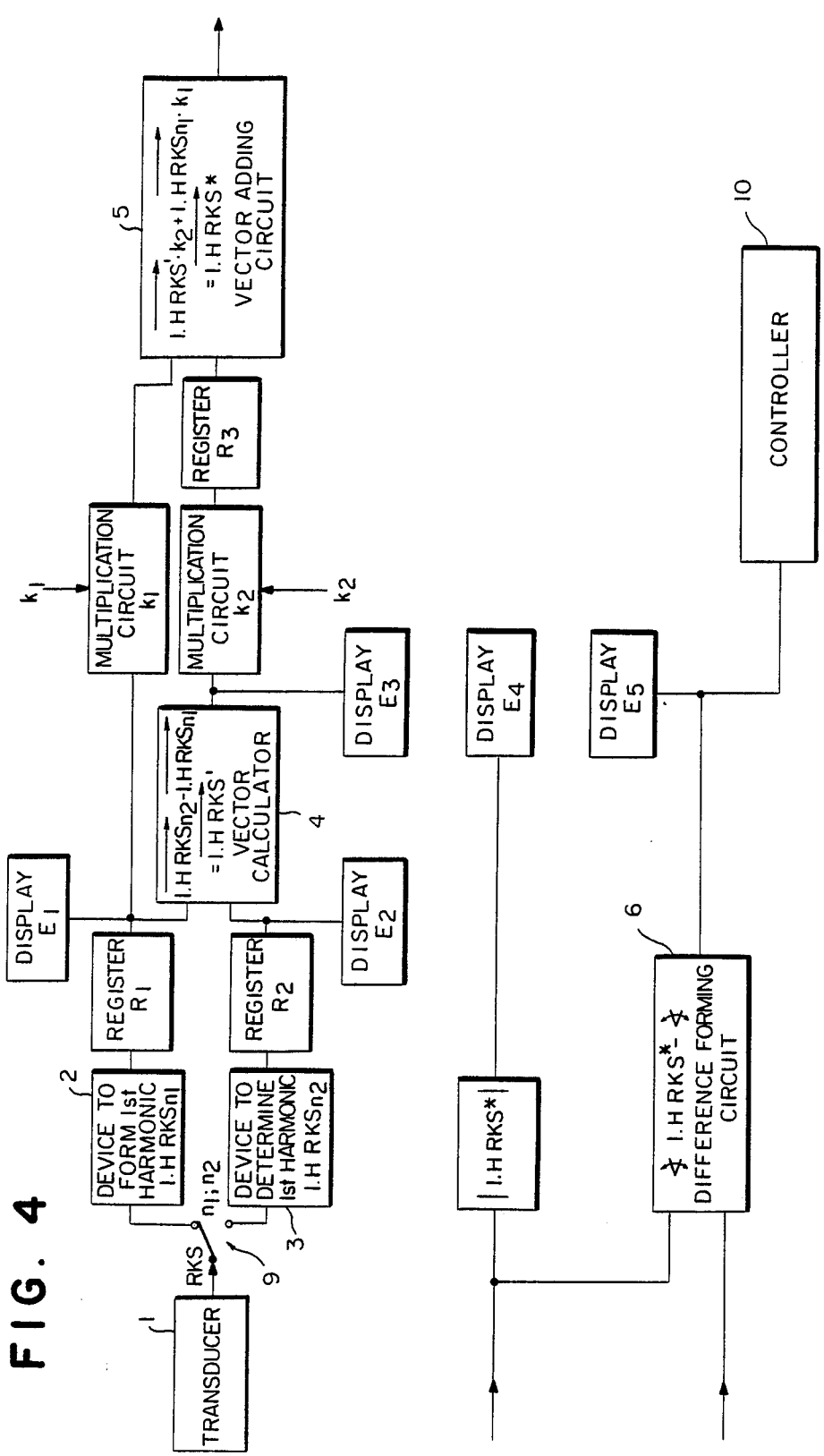
FIG. 4 is an electronic block diagram for calculation and processing of the vector of resultant tire radial force variation for the purpose of matching.

With the preferred embodiment which is illustrated in FIG. 3 and 4, two measuring runs are performed at different speeds with the tire rolling on the road wheel of a tire uniformity grading machine in order to determine both the radial force variations $F_R(c)$ due to differences in tire spring rate and the radial force variations $F_R(m)$ resulting from non-uniform mass distribution in the tire contact area. Said tire uniformity grading machine is for example known from HOFMANN news no. 15 "Machines and equipment for the tire and rim industry", edition 9622 057 03-77, page 6.

The first measuring run is performed at a speed where non-uniform mass distribution in the tire contact area does not affect much the radial force variation RKS. In FIG. 3A a vector 1.HRKSn1 of the peak value of radial force variation is plotted, representing the first harmonic of radial force variation detected with transducer 1. Furthermore FIG. 3A illustrates the vectors 1.HRKSn2 for peak values of radial force variation corresponding to the first harmonics which are detected by transducer 1 (FIG. 4) at different speeds (20, 50 and 80 km/h). Hence FIG. 3A clearly shows that the vectors of radial force variations change as a function of driving speed, or number of revs, during the measuring runs. This change both of magnitude and direction of the vectors results from the radial force variations due to non-uniform mass distribution in the tire contact area being function of speed and number of revs respectively. Said non-uniform mass distribution influences the radial force variations RKS detected by transducer 1 approximately in the range of the square of angular velocity $\omega^2$.

In the second measuring run speed is increased to a level chosen as a function of resonance speed of the suspension of the vehicle where the wheels will be fitted, although it might as well be inferior or superior to that level. At any rate speed has to be chosen such that the influence of non-uniform mass distribution in the tire contact area is appreciable in measurement.

The electronic block diagram illustrated in FIG. 4 shows the preferred embodiment of the inventive apparatus realizing the inventive method.

After relative setting of selector switch 9 the radial force variations detected at low speed $n_1$ by transducer 1 in the first measuring run are fed into the device 2 to form the first harmonic 1.HRKSn1 of said radial force variations RKS. The output of said device 2 is connected to the register $R_1$ where the vector of the peak value of the first harmonic 1.HRKSn1 of radial force variations due to differences in tire spring rate is stored. Register $R_1$ can be of analogue or digital type. The output of register $R_1$ is connected to display $E_1$ to read out the result stored in register $R_1$. For the second measuring run speed is increased to the next level $n_2$ and selector switch 9 is changed over so that the radial force variation RKS detected by transducer 1 is fed into the device 3 for determination of the first harmonic 1.HRKSn2 of said radial force variation which is, among others, due to non-uniform mass distribution in the tire contact area. Said device 3 may be a filter. The output of said device 3 is connected to register $R_2$ where the vector of the peak value of the first harmonic determined by device 3 is stored. The output of register $R_2$ is then connected to the display $E_2$ to read out the result stored in register $R_2$.

The vector calculator 4 forms then the difference between the vectors determined in devices 2 and 3 for the first harmonics by subtracting the vector of the first harmonic determined for the radial force variation at low speed from the vector determined for the first harmonic of radial force variations at higher speed. Consequently said vector calculator 4 performs a vector subtraction of the following equation 1:

$$1.\overrightarrow{HRKSn2} - 1.\overrightarrow{HRKSn1} = 1.\overrightarrow{HRKS}' \qquad (1)$$

The result of said vector subtraction is the vector portion 1.HRKS' of the radial force variation resulting uniquely from non-uniform mass distribution in the tire contact area. FIG. 3A illustrates the respective vectors calculated in this way for the first harmonics 1.HRKS' at speeds of 20, 50 and 80 km/h in the vector diagram.

Furthermore, the output of said device 2 for determination of the first harmonic at low measuring speed nl and the output of register $R_1$ respectively are connected to a first input of a vector adding circuit 5. The output signals of device 2 and register $R_1$ respectively are multiplied by an influence or corrective factor $k_1$ by a multiplication circuit $K_1$.

A second input of the vector adding circuit 5 is connected to the output of the vector calculated 4 which forms the differences in line with equation (1). Another multiplication circuit $K_2$ is interposed between the output of vector calculation 4 and the second input of the vector adding circuit 5 to multiply the output signal of vector calculator 4, which is read out on display $E_3$, by factor $k_2$ before it is passed on to the vector adding circuit 5. Another register $R_3$ is interposed between the multiplication circuit $K_2$ and the second input of the vector adding circuit 5 in order to store the output signal of vector calculator 4 when multiplied by factor $k_2$. This register, too, can be of analog or digital type.

Factors $k_1$ and $K_2$ are chosen empirically as a function of the type of vehicle where the wheel under test will be fitted. In general, the influence of corrective factor $k_1$ for radial force variation due to differences in tire spring rate will be more or less about 1, whereas the influence or corrective factor $k_2$ for radial force variations due to non-uniform mass distribution in the tire contact area will be chosen as a function of the type of vehicle where the tire will be fitted.

The vector adding circuit 5 performs a vector addition of the vector portion 1.HRKS' of the first harmonic of radial force variation resulting from non-uniform mass distribution in the tire contact area and of the vector of first harmonic 1.HRKSn1 for radial force variations resulting from differences in tire spring rate, while following equation (2) below where both vectors are multiplied by influence or corrective factors $k_1$ and $k_2$ respectively:

$$1\overrightarrow{HRKS} \times k_2 + 1.\overrightarrow{HRKSn1} \times k_1 = 1.\overrightarrow{HRKS}^* \qquad (2)$$

Said vector addition is illustrated in FIG. 3B. The result is the vector 1.HRKS* which is an optimized vector of resultant tire radial force variation to be opposed to radial run-out of the rim during the following matching procedure in a way to be specified below.

The output of the vector adding circuit 5 is connected to the input of the difference-forming circuit 6 where the phase of angular difference is calculated by subtraction of the angle of the vector 1.HKS* of the output signal of vector adding circuit 5 and a phase reference which represents a datum angle such as $\phi_0$ in FIGS. 1 and 2. This datum angle is chosen as a function of the position of the transducer 1 with respect to the tire 7 under test and the second transducer, which is not represented in detail and which is designed for determination of radial run-out of the rim.

Furthermore, there is a display $E_4$ to read out the output signal of vector adding circuit 5 which as indicative of vector 1.HRKS*, that is in particular, the magnitude of said vector. Another display $E_5$ is connected to the output of the difference-forming circuit 6 to read out the angular difference determined by said circuit 6.

The output signal of said circuit 6, which is indicative of the angular difference between the datum angle and the angular location of vector 1.HRKS* of resultant tire radial force variation available at the output of vector adding circuit 5, is used to control the controller 10 of the matching process. Said controller controls matching, that is readjustment of the rim with respect to the measured tire 7 so that said vector 1.HRKS* is opposed to, hence precisely 180° apart of, the direction of radial run-out of the rim. The device to realize such readjustment may be of conventional type, such as for example known from the German application No. 23 33 057 which so far has only been laid open to public inspection.

Radial force variations can be measured on the tire/rim assembly as well. Furthermore, it is possible to use the magnitude of the vector determined by the vector adding circuit 5, indicative of resultant tire radial force variation and used for matching purposes, to classify tires into quality grades, with said magnitude being read out on display $E_4$ such as already set forth above.

What is claimed is:

1. In a method for optimizing running characteristics of an automobile wheel having a rim and a tire fitted on the rim, wherein the tire and rim are rotated relative to each other to precisely defined positions in a matching process so that radial run-out, non-uniform mass distribution and differences in spring rate of the tire and rim are opposed, thereby reducing resultant radial force variations of the wheel, the improvements comprising initially detecting tire radial force variation at a low speed of rotation to determine a first radial force variation vector due to differences in tire spring rate, detecting tire radial force variation at a higher speed of rotation to determine a second radial force variation vector due to non-uniform mass distribution in a tire contact area, adding the first and second radial force variation vectors to obtain a resultant tire radial force variation vector, and then opposing the resultant tire radial force variation vector to radial run-out of the rim during the matching process.

2. A method as set forth in claim 1, in which radial force variations of the tire/rim assembly are measured.

3. A method as set forth in claim 1, in which the second radial force variation vector due to non-uniform mass distribution in the tire contact area is measured at a resonance speed of a wheel suspension system of a vehicle to which the wheel will be fitted.

4. A method as set forth in claim 1, in which first harmonics of the radial force variations are measured.

5. An apparatus for optimization of running characteristics of an automobile wheel, comprised of a rim and a tire fitted upon the rim and presenting spring qualities, the apparatus including:
- a transducer for detecting radial force variations, connected to a vector adding circuit to which resultant radial force variation vectors due to non-uniform mass distribution in the tire contact area and differences in tire spring rate are fed from analyzing circuits;
- a difference-forming circuit having an input to which the output of the adding circuit is connected to obtain angular difference of the angular output signal delivered by the output of the vector adding circuit and a datum angle signal; and
- a device to which the output of the difference-forming circuit is connected to a device for controlling adjustment of the tire relative to the rim as a function of said angular difference.

6. An apparatus as set forth in claim 5, including means in which the vector of radial force due to differences in tire spring rate is multiplied by an influence or corrective factor $k_1$ and the vector of radial force due to non-uniform mass distribution in the tire contact area by the influence or corrective factor $k_s$, with said influence or corrective factors $k_1$ and $k_2$ being preset in the apparatus.

7. An apparatus as set forth in claim 5, in which the analyzing circuits include a vector calculator to form the difference of vectors of respective first harmonics of the radial force variation detected at a rotational speed where the effect of non-uniform mass distribution in the tire contact area is appreciable and the ones of the radial force variation detected at a rotational speed where the effects of differences in tire spring rate are primarily appreciable, and in which the outputs of a vector calculator and another device included in the analyzing circuits are connected to the inputs of the vector adding circuit, with said device detecting the first harmonics of radial force variation at a rotational speed where the effects of differences in tire spring rate are primarily appreciable.

* * * * *